United States Patent Office 3,174,974
Patented Mar. 23, 1965

3,174,974
N-CYANO-ETHYLATED 2,5-DI-[BENZIMIDAZ-OLYL-(2')]THIOPHENES
Adolf Emil Siegrist, Basel, Erwin Maeder, Munchenstein, and Peter Liechti, Binningen, Switzerland, assignors to Ciba Limited, Basel, Switzerland, a company of Switzerland
No Drawing. Filed Sept. 19, 1962, Ser. No. 224,853
Claims priority, application Switzerland, Sept. 29, 1961, 11,335/61
2 Claims. (Cl. 260—309.2)

The present invention provides new, valuable diimidazoles which, like for instance the compound of the formula (1) 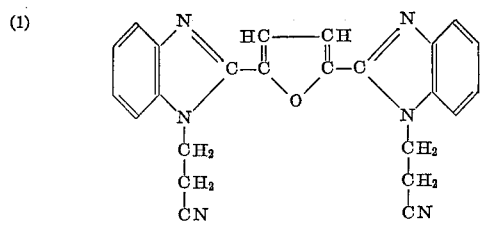

correspond to the general formula (2) 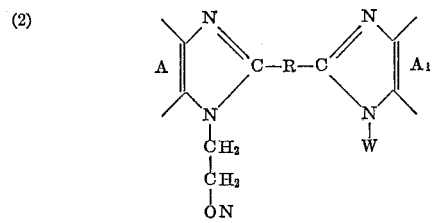

in which A and $A_1$ each represents a benzene radical condensed with the imidazole ring in the manner indicated by the valency lines; W represents an alkyl, hydroxyalkyl, cyanoalkyl or alkenyl group with up to 4 carbon atoms or an aralkyl group, and R represents a 5-membered diunsaturated heterocyclic radical which contains one hetero atom and is linked with the imidazole rings in positions 2 and 5.

The benzene radicals A and $A_1$ in the Formula 2 may contain further substituents, for example alkyl or alkoxy groups or halogen such as chlorine atoms.

The new diimidazoles of the Formula 2 may be imidazyl-furan, imidazyl-thiophene or imidazyl-pyrrole compounds.

From among the new diimidazoles of the composition defined above there may be mentioned, for example, those of the formula (3) 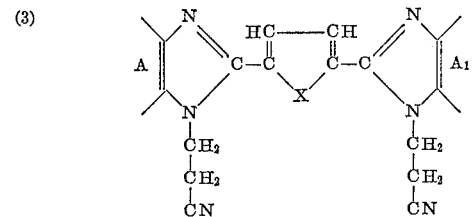

in which A and $A_1$ have the above meanings and X represents an oxygen or a sulfur atom, an —NH-group or a group of the formula

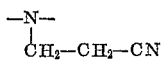

among these diimidazoles those deserve special mention which correspond to the formula (4) 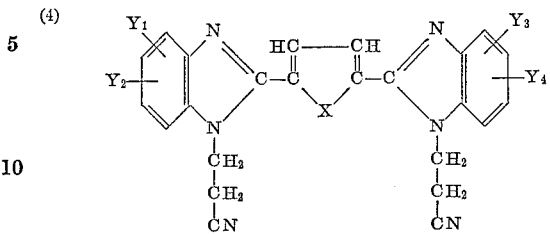

in which $Y_1$ and $Y_3$ each represents a hydrogen atom or an alkyl group with 1 to 4 carbon atoms; $Y_2$ and $Y_4$ each represents a hydrogen or chlorine atom, or an alkyl or alkoxy group with 1 to 12 carbon atoms, and X represents an oxygen or a sulfur atom, an —NH-group or a group of the formula

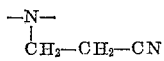

To manufacture the new diimidazoles of the Formula 2 a compound of the formula (5) 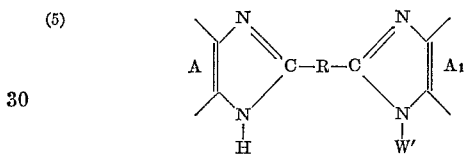

in which A, $A_1$ and R have the above meanings and W' stands for a hydrogen atom, or an alkyl, hydroxyalkyl or alkenyl group with up to 4 carbon atoms or an aralkyl group, is reacted with acrylonitrile in the presence of a basic catalyst, and if desired in the presence of a solvent.

The compounds of the Formula 5, used as starting materials in the present process, are either known or can be prepared by known methods.

Catalysts suitable for use in the present process are, for example, amines such as N:N:N':N'-tetramethyl-ethylenediamine, N:N:N':N'-tetramethyl-1:3-diamino-butane, tetramethylguanidine and 1:4-diaza-bicyclo-(2:2:2)-octane.

The process used for the manufacture of the new compounds may consist, for example, in gradually heating the reaction mixture of the two starting materials in the presence of the basic catalyst to the boil and refluxing it at the boil until the reaction is complete. After cooling, the new diimidazoles can be isolated from the reaction mixture by known methods.

The new diimidazoles of the above composition obtained by the present process are particularly valuable optical brightening agents. They are suitable for optically brightening a wide variety of materials, more especially organic materials. Good results are obtained, for example, in brightening lacquers such as acrylic resin lacquers or alkyd resin lacquers. They are especially suitable for optically brightening fibrous materials, for example fibers of native or regenerated cellulose such as cotton, or viscose rayon, also semi-synthetic or fully synthetic fibers, for example from cellulose esters such as cellulose diacetate or triacetate, polyamides (nylon), polyacrylonitrile (Orlon), polyvinyl chloride or polyolefines such as polyethylene or polypropylene, as well as films, foils, tapes or shaped structures made from these materials or from other materials, such as polystyrene.

When fibers—which may be in the crude state, in the form of skeins or fabrics—are to be optically brightened with the new diimidazoles, it is of advantage to work in an aqueous medium in which the chosen compound has been finely suspended or dissolved in the form of a salt thereof. If desired, the treatment bath may further contain a dispersant, for example a soap, a polyglycol ether of fatty alcohols, fatty amines or alkylphenols, cellulose sulfite waste liquor or a condensation product of a possibly alkylated naphthalenesulfonic acid with formaldehyde. It has been found to be especially advantageous to use a neutral, a weakly alkaline or an acidic bath. It is likewise of advantage to perform the process at an elevated temperature of about 50 to 100° C., for example at the boiling temperature of the bath or in its vicinity (about 90° C.). By using one of the new diimidazoles, more especially an imidazylfuran or imidazylthiophene compound of the Formula 3 or 4, the resulting strong brightening effect is particularly stable towards acids. When optically brightening cotton dressed with synthetic resins, the new diimidazoles likewise produce valuable brightening effects.

Furthermore, the new diimidazoles may be added to or incorporated with the material before or during its shaping. Thus, in the manufacture of films, foils, tapes or shaped structures they may be added to the moulding composition or they may be dissolved or finely dispersed in the spinning mass before spinning. The new diimidazoles of the composition defined above may also be added to polyamides before or during the polycondensation, or to the reaction mixture before or during the polymerization of monomers, such, for example, as acrylonitrile or vinyl chloride.

The amount of the new diimidazole to be used, referred to the weight of the material to be optically brightened, may vary within wide limits. Even a very small amount, in some cases for instance as little as about 0.01%, may produce a distinct and durable effect. While in general an amount of more than about 3% will not prove harmful, it does not offer any advantage over the normal amount.

The new diimidazoles may be used as brighteners also in the following ways:

(a) In admixture with dyestuffs or pigments or as additives to dyebaths, printing, discharge or resist pastes. Also for after-treating dyeings, prints or discharges.

(b) In admixture with chemical bleaches or as additive to bleaching baths.

(c) In admixture with dressing agents, such as starches or synthetic dressing agents. The products of the invention may also be added, for example, to liquors used for producing a crease-resisting finish.

The new brightening agents of the composition defined above behave especially favorably when incorporated with detergents, more especially the usual detergents used for washing textile materials, to which they may be added in the usual amount ranging from about 0.01 to 0.5% calculated on the total weight of the detergent. Detergents containing as brightening agents the new diimidazoles of the composition defined above are substantially colorless and produce a white content superior to that obtained with comparable detergents that do not contain the brightener.

Unless otherwise indicated, parts and percentages in the following examples are by weight. Temperatures are in ° C.

Example 1

A mixture of 31.8 parts of 2:5-di-[benzimidazolyl-(2')]-furan (monohydrate), 200 parts by volume of acrylonitrile and 20 parts of N:N:N':N'-tetramethyl-1:3-diaminobutane is heated with stirring within 30 minutes to the refluxing temperature and then refluxed for 16 hours, and cooled to about 5° C.; the precipitated reaction product is suctioned off, washed portionwise with 200 parts by volume of cold ethanol, and dried. Yield: about 36.6 parts (=90.2% of the theoretical) of 2:5-di-[1'-(β-cyanoethyl)-benzimidazolyl-(2')]-furan of the formula (1)

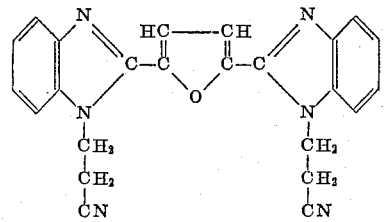

in the form of a pale-beige colored, finely crystalline powder which melts at 215-216.5° C. Atfer three recrystallizations from dioxane+ethanol+water (1:10:5) with the aid of active carbon, substantially colorless, small needles are obtained which melt at 217.5-218.4° C.

Analysis: $C_{24}H_{18}ON_6$ molecular weight: 406.46—

|  | C | H | N |
|---|---|---|---|
| Calculated_____percent__ | 70.92 | 4.46 | 20.68 |
| Found_____do____ | 70.84 | 4.58 | 20.53 |

When using, instead of 20 parts of N:N:N':N'-tetramethyl-1:3-diaminobutane, 20 parts of N:N:N':N'-tetramethyl-ethylenediamine or 20 parts of 1:4-diaza-bicyclo-(2:2:2)-octane, there are obtained about 33.2 parts and, respectively, 31.4 parts (=81.7%, and respectively 77.3%, of the theoretical yield) of 2:5-di [1'-(β-cyanoethyl)-benzimidazolyl-(2')]-furan of the Formula 1.

In an analogous manner there are obtained:

(A) From 17.32 parts of 2:5-di-[6'-methyl-benzimidazolyl-(2')]-furan, 150 parts by volume of acrylonitrile, 10 parts of N:N:N':N'-tetramethyl-1:3-diaminobutane (refluxing for 15 hours) about 16.4 parts (=75.7% of the theoretical yield) or 2:5-di-[1'-(β-cyano-ethyl)-6'-methyl-benzimidazolyl-(2')]-furan of the formula (6)

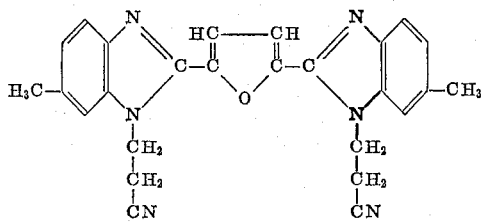

in the form of a light-beige colored powder. Three recrystallizations from chlorobenzene furnish substantially colorless, very fine, felted needles melting at 223.2 to 223.8° C.

Analysis: $C_{26}H_{22}ON_6$. Molecular weight: 434.48—

|  | C | H | N |
|---|---|---|---|
| Calculated_____percent__ | 71.87 | 5.10 | 19.34 |
| Found_____do____ | 71.82 | 5.12 | 19.23 |

(B) From 19.36 parts of 2:5-di-[6'-chloro-benzimidazolyl-(2')]-furan, 150 parts by volume of acrylonitrile, 10 parts of N:N:N':N'-tetramethyl-1:3-diaminobutane (refluxing for 15 hours), about 21.9 parts (=92.3% of the theoretical yield) of 2:5-di-[1'-(β-cyanoethyl-6'-chloro-benzimidazolyl-2')]-furan of the formula (7)

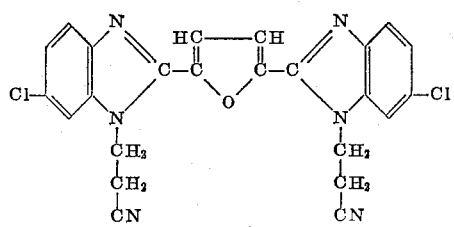

in the form of a pale-yellow, finely crystalline powder.

Three recrystallizations from ortho-dichlorobenzene furnish pale yellow, very fine needles melting at 245 to 247° C.

Analysis: $C_{24}H_{16}ON_6Cl_2$. Molecular weight: 475.35—

|  | C | H | N |
|---|---|---|---|
| Calculated _____ percent__ | 60.64 | 3.39 | 17.68 |
| Found _____ do____ | 60.37 | 3.51 | 17.76 |

(C) From 18.72 parts of 2:5-di-[5':6'-dimethyl-benzimidazolyl-(2')]-furan, 150 parts by volume of acrylonitrile, 10 parts of N:N:N':N'-tetramethyl-1:3 diaminobutane (refluxing for 15 hours), about 16.2 parts (=70.2% of the theoretical yield) of 2:5-di-[1'-β-cyanoethyl)-5',6'-di-methyl-benzimidazolyl-(2')]-furan of the formula (8)
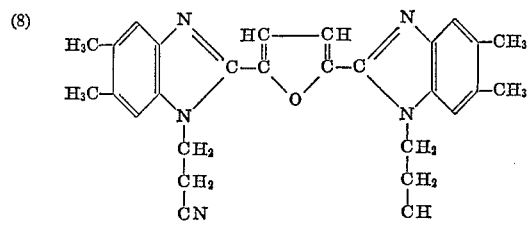

in the form of a light-yellow, finely crystalline powder. Four recrystallizations from dioxane+ethanol+water (2:2:1) furnish light-yellow, very fine, felted needles melting at 281 to 282° C.

Analysis: $C_{28}H_{26}ON_6$. Molecular weight 462.54—

|  | C | H | N |
|---|---|---|---|
| Calculated _____ percent__ | 72.70 | 5.67 | 18.17 |
| Found _____ do____ | 72.83 | 5.79 | 18.07 |

(D) From 18.92 parts of 2:5-di-[6'methoxy-benzimidazolyl-(2')]-furan, 150 parts by volume of acrylonitrile, 10 parts of N:N:N':N'-tetramethyl-1:3-diaminobutane (refluxing for 14 hours), about 13.2 parts (=56.7% of the theoretical yield) of 2:5-di-[1'-(β-cyanoethyl)-6'-methoxy-benzimidazolyl-(2')]-furan of the formula in the (9)
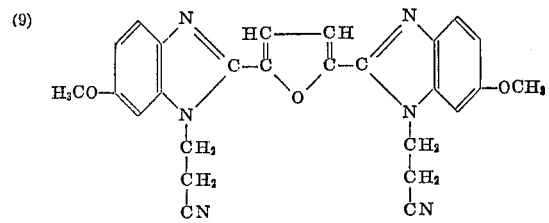

form of a bright, beige-colored powder. Three recrystallizations from chlorobenzene furnish a light-yellow, finely crystalline powder melting at 223 to 226° C.

Analysis: $C_{26}H_{22}O_3N_6$. Molecular weight: 466.48—

|  | C | H | N |
|---|---|---|---|
| Calculated _____ percent__ | 66.94 | 4.75 | 18.02 |
| Found _____ do____ | 66.72 | 4.82 | 17.77 |

*Example 2*

A mixture of 32.5 parts of 2:5-di-[benzimidazolyl-(2')]-thiophene (containing ½ mol of water of crystallization), 200 parts by volume of acrylonitrile and 20 parts of N:N:N':N' - tetramethyl-1:3-diaminobutane is heated within 30 minutes with stirring to the refluxing temperature and refluxed for 66 hours, then cooled to about 2° C.; the reaction product is suctioned off, washed with 200 parts by volume of cold ethanol in several portions, and dried. Yield: about 38.1 parts (=90.2% of the theoretical) of 2:5-di-[(1'cyanoethyl) - benzimidazolyl-(2)]-thiophene of the formula

(10)
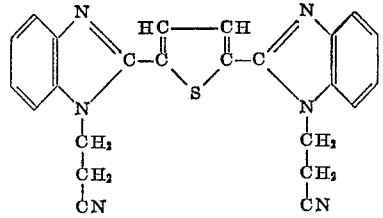

in the form of a light-beige colored, finely crystalline powder melting at 224–225° C. After five recrystallizations from dioxane+water (1:1) with the aid of active carbon there are obtained substantially colorless, shiny, very fine needles melting at 226 to 227° C.

Analysis: $C_{24}H_{18}N_6S$. Molecular weight: 422.52—

|  | C | H | N | S |
|---|---|---|---|---|
| Calculated _____ percent__ | 68.22 | 4.29 | 19.89 | 7.59 |
| Found _____ do____ | 67.92 | 4.48 | 19.86 | 7.63 |

When the reaction time is shortened from 66 to 15 hours, there are obtained about 34.8 parts (=80% of the theoretical yield) of 2:5-di-[1'-(β-cyanoethyl)-benzimidazolyl-(2')]-thiophene of the Formula 10.

When the 200 parts by volume of acrylonitrile are replaced by a mixture of 100 parts by volume of acrylonitrile and 100 parts by volume of pyridine, and the reaction is conducted for 15 hours at 84 to 85° C. under reflux, there are obtained about 35.9 parts (=82.6% of the theoretical yield) of 2:5-di-[1'-(β-cyanoethyl)-benzimidazolyl-(2')]-thiophene of the Formula 10.

When the 32.5 parts of 2:5-di-[6'-methyl-benzimidazolyl-(2')]-thiophene, the resulting yield amount to about 14.3 parts (=62.3% of the theoretical) of 2:5-di-[1'-(β-cyanoethyl)-6-methyl-benzimidazoly - (2')]thiophene of the formula

(11)
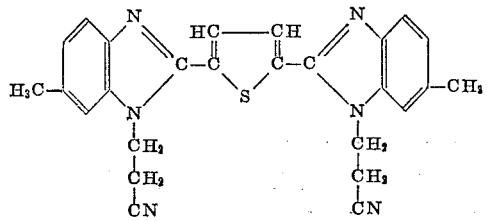

in the form of a yellow, crystalline powder which after three recrystallizations from ethanol with the aid of active carbon melts at 194.8 to 195.2° C.

Analysis: $C_{26}H_{22}N_6S$ ½ $H_2O$. Molecular weight: 459.58—

|  | C | H | N |
|---|---|---|---|
| Calculated _____ percent__ | 67.95 | 5.04 | 18.29 |
| Found _____ do____ | 68.08 | 4.84 | 18.28 |

*Example 3*

A mixture of 29.9 parts of 2:5-di-[benzimidazolyl-(2')]-pyrrole, 200 parts by volume of acrylonitrile and 20 parts of N:N:N':N'-tetramethyl-1:3-diaminobutane is heated within 30 minutes with stirring to the refluxing temperature and then refluxed for 18 hours, and cooled to about 2° C.; the precipitated reaction product is suctioned off, dried portionwise with 200 parts by volume of cold ethanol, and dried. Yield: about 35.5 parts (=87.6% of the theoretical) of 2:5-di-[1'-(β-cyanoethyl)-benzimidazolyl-(2')]-pyrrole of the formula

(12)
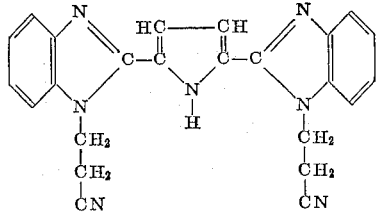

in the form of a substantially colorless, finely crystalline powder melting at 212 to 213° C. After three recrystallizations from dioxane+ethanol (1:10) with the aid of active carbon there are obtained colorless, very fine, felted needles melting at 224 to 224.8° C.

Analysis: $C_{24}H_{19}N_7$. Molecular weight: 405.45—

|  | C | H | N |
|---|---|---|---|
| Calculated_____percent__ | 71.09 | 4.72 | 24.18 |
| Found_____do____ | 71.19 | 4.82 | 24.44 |

When the 20 parts of N:N:N':N'-tetramethyl-1:3-diaminobutane are replaced by 20 parts of N:N:N':N'-tetramethyl-guanidine and the reaction time is extended to 20 hours, the yield amounts to about 43.5 parts (=94.8% of the theoretical) of 2:5-di-[1-(β-cyanoethyl)-benzimidazolyl-(2')]-1-(β-cyanoethyl) - pyrrole of the formula

(13)
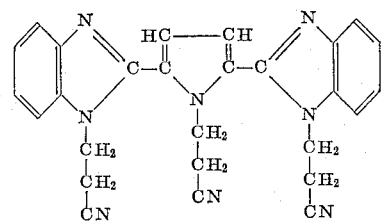

in the form of a light-beige colored, finely crystalline powder which melts at 243 to 244° C. After three recrystallizations from dioxane+ethanol+water (2:1:2) with the aid of active carbon there are obtained colorless, very fine, felted needles melting at 261.8 to 262.4° C.

Analysis: $C_{27}H_{22}N_8$. Molecular weight: 458.51—

|  | C | H | N |
|---|---|---|---|
| Calculated_____percent__ | 70.72 | 4.84 | 24.44 |
| Found_____do____ | 70.67 | 5.11 | 24.63 |

Example 4

Polyacrylonitrile fabric, for example Orlon, is treated at a goods-to-liquor ratio of 1:40 with 0.06% of 2:5-di-[1'-(β-cyanoethyl)-benzimidazolyl-(2')] - furan for one hour at about 60 to 100° C. in a bath containing per liter 1 g. of formic acid of 85% strength, then rinsed and dried. The fabric treated in this manner has a higher white content than the untreated material.

Example 5

Soap (sodium salt of higher fatty acids) is mixed with 0.2% of 2:5-di-[1'-(β-cyanoethyl)-benzimidazolyl-(2')]-thiophene, and undyed textile materials (consisting of cellulose fibers, polyamide fibers and acetate rayon) are washed in a bath containing per liter 4 g. of the soap incorporating the brightener for 30 minutes at 50° C. at a goods-to-liquor ratio of 1:30. After having been washed, all three types of fibers have a lighter appearance than when washed with plain soap.

What is claimed is:
1. The compound of the formula

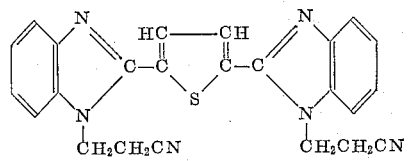

2. The compound of the formula

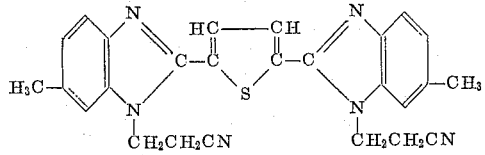

References Cited in the file of this patent
UNITED STATES PATENTS

| 2,901,480 | Siegrist et al. _____ Aug. 25, 1959 |
| 2,937,997 | Crounse _____ May 24, 1960 |
| 2,995,564 | Duennenberger et al. _____ Aug. 8, 1961 |
| 3,005,779 | Ackermann et al. _____ Oct. 24, 1961 |
| 3,010,967 | Siegrist et al. _____ Nov. 28, 1961 |